United States Patent
Ko et al.

(10) Patent No.: US 11,372,789 B2
(45) Date of Patent: Jun. 28, 2022

(54) METHOD FOR CONNECTING EXTERNAL AUDIO DEVICE AND ELECTRONIC DEVICE THEREOF

(71) Applicant: Samsung Electronics Co., Ltd., Suwon-si (KR)

(72) Inventors: Junho Ko, Suwon-si (KR); Youngjun An, Suwon-si (KR); Jiyoung Lim, Suwon-si (KR); Janghoon Hong, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 16/831,654

(22) Filed: Mar. 26, 2020

(65) Prior Publication Data

US 2020/0311004 A1 Oct. 1, 2020

(30) Foreign Application Priority Data

Mar. 26, 2019 (KR) ........................ 10-2019-0034094

(51) Int. Cl.
*G06F 13/40* (2006.01)
*H01R 13/66* (2006.01)
(Continued)

(52) U.S. Cl.
CPC ...... *G06F 13/4022* (2013.01); *G06F 11/3051* (2013.01); *H01R 13/66* (2013.01);
(Continued)

(58) Field of Classification Search
CPC ............. G06F 13/4022; G06F 11/3051; G06F 2213/0042; H01R 13/66; H01R 24/58; H01R 27/00; H04M 1/6058
See application file for complete search history.

(56) References Cited

U.S. PATENT DOCUMENTS 9,699,545 B1 7/2017 Jain et al.
9,807,507 B1* 10/2017 Liu ..................... H04R 3/12
(Continued)

FOREIGN PATENT DOCUMENTS

CN 108268395 A 7/2018
CN 109218872 A 1/2019
(Continued)

OTHER PUBLICATIONS

International Search Report and Written Opinion of the International Searching Authority in connection with International Application No. PCT/KR2020/004069 dated Jul. 13, 2020, 8 pages.
(Continued)

*Primary Examiner* — Brian T Misiura

(57) ABSTRACT

An electronic device may include a connection unit including four ports for connecting an external audio device; a codec configured to generate an audio signal transmitted to the external audio device; a first switch unit configured to, if the external audio device is electrically connected to the electronic device, connect the first port and the second port with the codec; a second switch unit configured to, if the external audio device is electrically connected to the electronic device, connect the third port and the fourth port with the codec; a third switch unit configured to swap connection directions of the third port and the fourth port according to a coupling orientation of the external audio device and the electronic device; and a ground unit connected to the third port and the fourth port and configured to ground one of the third port and the fourth port.

10 Claims, 9 Drawing Sheets

(51) Int. Cl.
*H01R 27/00* (2006.01)
*G06F 11/30* (2006.01)
*H01R 24/58* (2011.01)
*H04M 1/60* (2006.01)

(52) U.S. Cl.
CPC ............ *H01R 24/58* (2013.01); *H01R 27/00* (2013.01); *H04M 1/6058* (2013.01); *G06F 2213/0042* (2013.01)

(56) References Cited

U.S. PATENT DOCUMENTS

| | | | |
|---|---|---|---|
| 9,876,884 B2 | 1/2018 | Yun et al. | |
| 9,949,047 B2* | 4/2018 | Ryu | H04R 29/001 |
| 10,162,779 B2* | 12/2018 | Schnell | G06F 13/385 |
| 10,187,727 B2* | 1/2019 | Rand | H04R 5/04 |
| 2014/0211958 A1 | 7/2014 | Zhang et al. | |
| 2017/0017595 A1 | 1/2017 | Schnell | |
| 2017/0127203 A1* | 5/2017 | Ryu | H04R 5/04 |
| 2017/0195778 A1* | 7/2017 | Zhao | H04R 3/00 |
| 2017/0277650 A1* | 9/2017 | Zhao | G06F 13/385 |
| 2019/0257869 A1* | 8/2019 | Lee | G06F 3/162 |

FOREIGN PATENT DOCUMENTS

| | | |
|---|---|---|
| KR | 10-1560619 B1 | 10/2015 |
| KR | 10-2017-0060522 A | 6/2017 |
| KR | 10-2017-0095032 A | 8/2017 |
| KR | 10-1822939 B1 | 1/2018 |

OTHER PUBLICATIONS

European Patent Office, "Supplementary European Search Report" dated Feb. 23, 2022, in connection with European Patent Application No. 20779378.7, 9 pages.

* cited by examiner

METHOD FOR CONNECTING EXTERNAL AUDIO DEVICE AND ELECTRONIC DEVICE THEREOF

CROSS-REFERENCE TO RELATED APPLICATION

This application is based on and claims priority under 35 U.S.C. § 119 to Korean Patent Application No. 10-2019-0034094 filed on Mar. 26, 2019 in the Korean Intellectual Property Office, the disclosure of which is incorporated by reference herein in its entirety.

BACKGROUND

1. Field

The disclosure relates to a method for connecting an external audio device and an electronic device thereof.

2. Description of Related Art

Recently, to reduce an electronic device in volume, a 3.5 pi earjack connector is removed and an analog earphone is connected through a type-C connector. In the 3.5 pi earjack connector which connects an electronic device and an earphone, the earphone is connected to a codec embedded in the electronic device through left and right ports which are a receiver and microphone (MIC) and ground ports which are a transmitting side. A wire for the 3.5 pi earjack embedded in the electronic device is used only for the earphone. By contrast, since the electronic device adopting the type-C connector connects the earphone through the type-C connector, part of the wire connected to the codec of the electronic device may be used in common as a wire for a type-C universal serial bus (USB) connected to the type-C connector.

Since the 3.5 pi earjack connector is not used for other purpose than the earphone connection, the wire for the 3.5 pi earjack embedded in the electronic device is dedicated to the connection between the codec and the earphone. Since part of the wire connected to the type-C connector is shared in part with the wire for other purpose, optimizing the sharing part for the connection with the earphone may affect connection performance of other devices.

SUMMARY

To address the above-discussed deficiencies of the prior art, it is a primary aspect of the disclosure to provide a method for improving crosstalk performance in connecting an audio device through a type-C connector, and an electronic device thereof.

According to an embodiment, an electronic device may include a connection unit including a first port, a second port, a third port, and a fourth port for connecting an external audio device, a codec configured to generate an audio signal transmitted to the external audio device, a first switch unit configured to, if the external audio device is electrically connected to the electronic device, connect the first port and the second port with the codec, a second switch unit configured to, if the external audio device is electrically connected to the electronic device, connect the third port and the fourth port with the codec, a third switch unit configured to swap connection directions of the third port and the fourth port according to a coupling orientation of the external audio device and the electronic device, and a ground unit connected to the third port and the fourth port and configured to ground one of the third port and the fourth port, wherein one of the third port and the fourth port, the one grounded, may be selected based on the coupling orientation of the external audio device.

According to an embodiment, an operating method of an electronic device may include detecting coupling of an external audio device and a connection unit, detecting an orientation of the detected coupling of the external audio device, connecting ports of the external audio device to a codec, by controlling switch units connected to wires between the external audio device and the codec, and grounding one of ports connected to a transmission wire of the wires according to the coupling orientation.

Other aspects, advantages, and salient features of the disclosure will become apparent to those skilled in the art from the following detailed description, which, taken in conjunction with the annexed drawings, discloses various embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, various embodiments are described in detail by referring to the attached drawings.

Figure 1:
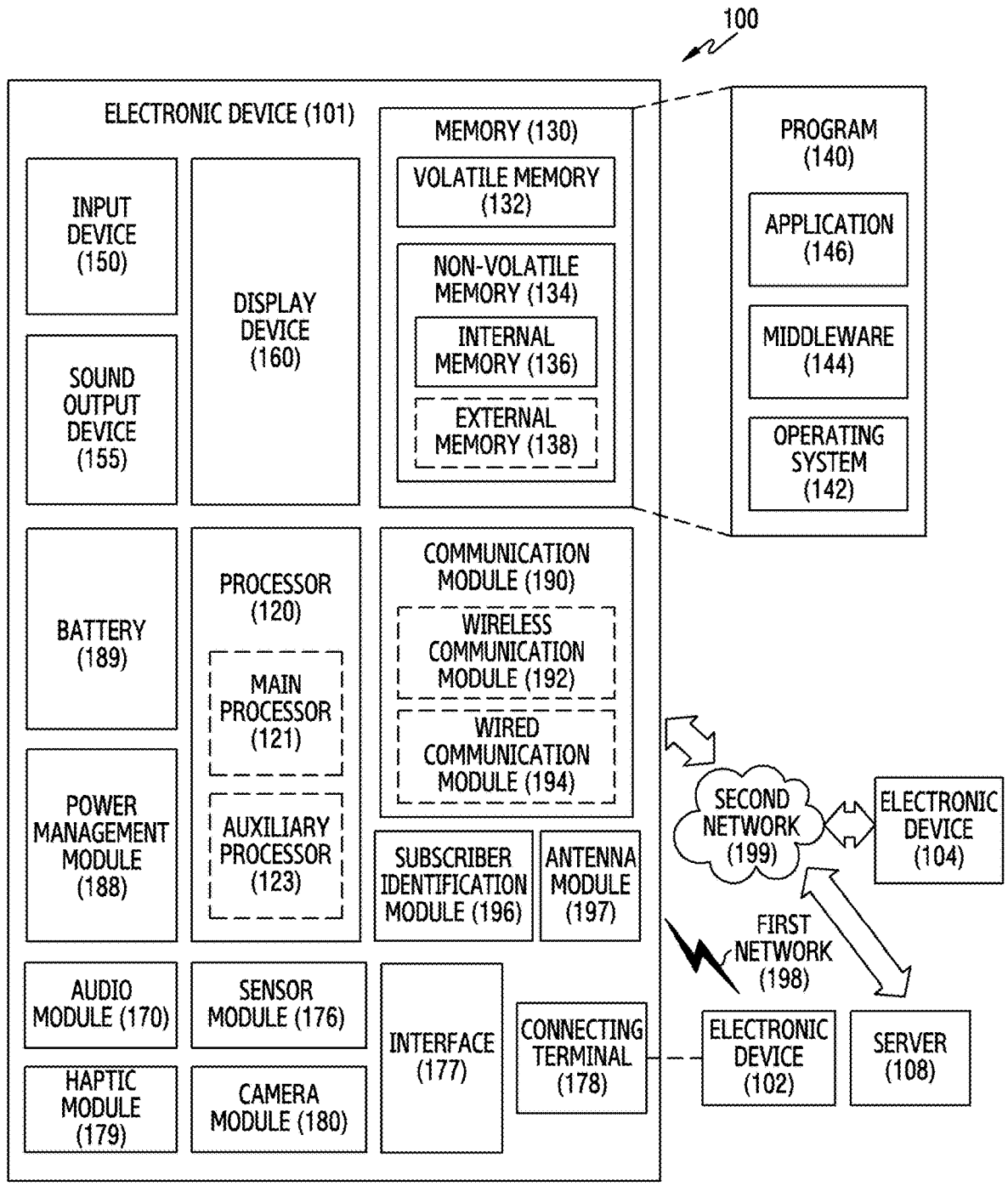
FIG. 1 illustrates a block diagram of an electronic device in a network environment according to an embodiment of the disclosure.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

As shown in FIG. 1, the electronic device 101 may include the connecting terminal 178. According to an embodiment, the connecting terminal 178 may include a type-C connector. The type-C connector may be used to connect an earphone, a charger or another electronic device. If an earphone to connect uses a rounded 3.5 pi earjack, an audio accessory (e.g., a dongle) may be further used for the connection with the type-C connector. The audio accessory may include a type-C universal serial bus (USB) connector for coupling with the type-C connector of the electronic device and an earjack for coupling with an audio device (e.g., an earphone). The audio accessory may be coupled with the electronic device 101 and the audio device (e.g., the electronic device 102 of FIG. 1), thus matching a port of the type-C connector of the electronic device and a port of the earjack and connecting the electronic device 101 and the audio device. If the earphone to connect includes the type-C connector, the earphone may be coupled to the type-C connector of the electronic device 101, without using an additional accessory.

The type-C connector may include a plurality of ports, and the plurality of the ports may be connected to a codec through wires installed in the electronic device 101. In various embodiments of the disclosure, the electronic device 101 and the audio device may be interconnected, by matching the ports of the type-C connector and the ports of the audio. For example, the type-C connector may include a first port and a second port for a signal transmitted to the audio device to connect the audio device, and a third port and a fourth port for a signal received from the audio device. For example, the type-C connector may include a plurality of ports defined as A1 through A12 and B1 through B12, and the ports may be used as shown in Table 1.

TABLE 1

| Case | Orientation control signal | Ground control signal |
|---|---|---|
| No external device | LOW | LOW |
| Earphone (3 poles) | LOW | HIGH |
| Earphone (4 poles)-forward orientation | LOW | HIGH |
| Earphone (4 poles)-reverse orientation | HIGH | LOW |

If the type-C connector of the electronic device 101 and the connector of the audio device are coupled in a forward orientation, the MIC port of and the ground (GND) port of the audio device may be connected to the B8 port (sideband use (SBU)2) and the A8 port (SBU1) of the type-C connector. Since the type-C connector may be connected in any orientation, the type-C connector of the electronic device 101 and the connector of the audio device may be coupled in a reverse orientation. In the reversed coupling, the MIC port and the GND port of the audio device may be connected to the A8 port and the B8 port of the type-C connector. The right port of the audio device may be connected to the A6 port (Dp) and the B6 port (Dp) of the type-C connector port regardless of the coupling orientation, and the left port of the audio device may be connected to the A7 port (Dn) and the B7 port (Dn) of the type-C connector regardless of the coupling orientation.

If connecting the earphone through the type-C connector of the electronic device 101, part of the wire connected to the codec of the electronic device 101 may be used in common as the wire for the type-C USB connected to the type-C connector. Since part of the wire used in common is also used to connect other component than the codec, the wire connected to the type-C connector may include at least one switch for controlling a signal path. Due to the at least one switch, internal resistance on the wire for delivering the signal between the audio device and the codec may increase and the increased internal resistance may cause crosstalk. The crosstalk may indicate performance degradation caused by an electrical effect of one signal on another signal. The internal resistances caused by the switch may be represented as an equivalent circuit as shown in FIG. 2.

Figure 2:
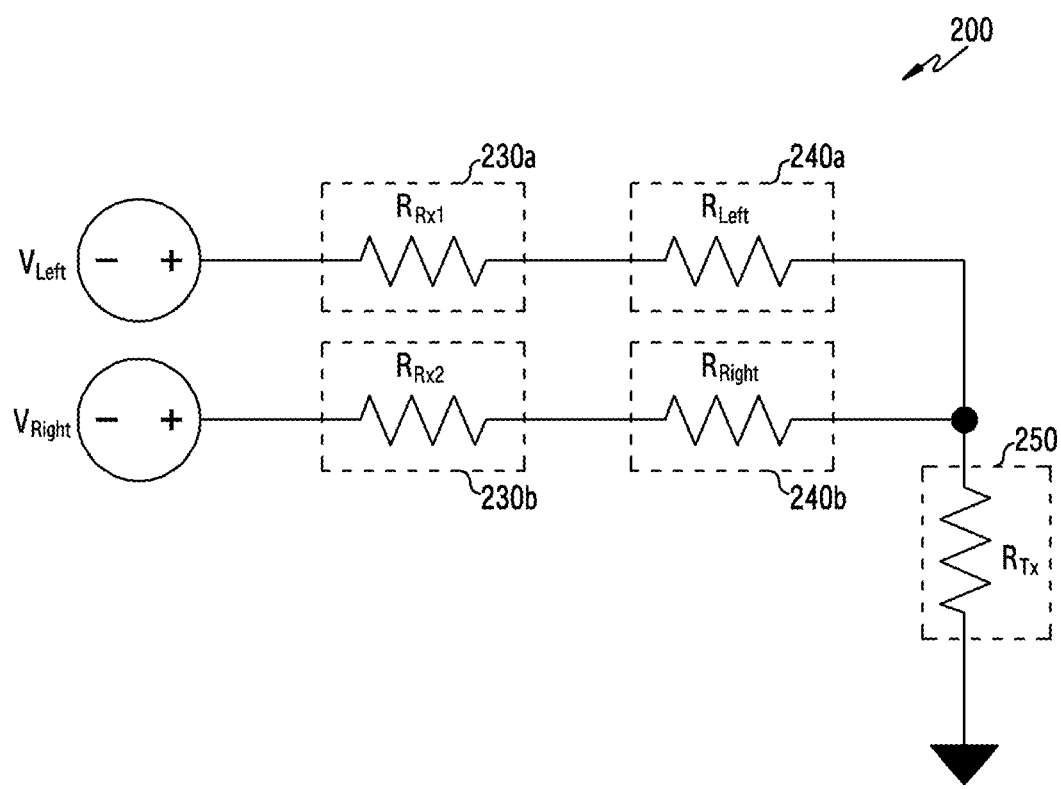
FIG. 2 illustrates an equivalent circuit diagram which represents resistance of a ground unit as composite resistance with an electronic device and an audio device connected according to an embodiment of the disclosure.

FIG. 2 illustrates an equivalent circuit diagram 200 which represents resistance of a transmitting side as composite resistance with an electronic device and an audio device connected according to an embodiment of the disclosure. Referring to FIG. 2, circuitry between the codec of the electronic device 101 and the audio device may include resistance $R_{Rx1}$ 230a on a wire connected to a left reception port of the audio device, resistance $R_{Left}$ 240a of the left reception circuit of the audio device, switch resistance $R_{Rx2}$ 230b on a wire connected to a right reception port of the audio device, resistance $Li_gh_t$ 240b of the right reception circuit of the audio device, and/or composite resistance $R_{TX}$ 250 of a wire connected to a transmission port of the audio device. The composite resistance $R_{TX}$ 250 may be the composite resistance of at least one switch disposed on the wire connected to a transmission port of the audio device.

For example, in the circuit diagram 200, if a signal is induced to $V_{left}$, the crosstalk may be defined as 20 log $[V_{OutR}/V_{OutL}]$. For example, assuming that $R_{Rx1}=R_{Rx2}$, $R_{Right}+R_{Rx}\gg R_{Tx}$, the crosstalk may be calculated as 20 log $[R_{Tx}/(R_{Right}+R_{Rx}+R_{Tx})]$, because $V_{OutL}=[R_{Left}/(R_{Rx1}+R_{Left}+R')]\times V_{Left}$, $R'=R_{Tx}//(R_{Right}+R_{Rx2})$, $V_{OutR}=[R_{Right}/(R_{Rx2}+R_{Right})]\times V_{Tx}$, and $V_{Tx}=[R'/(R_{Rx1}+R_{Left}+R')]\times V_{Left}$. Since the magnitude $R_{TX}$ of the composite resistance 250 is included in the denominator of the crosstalk calculation formula, the crosstalk may decrease as the magnitude $R_{TX}$ of the composite resistance 250 reduces. Since $R_{TX}$, which is included in the denominator of the crosstalk calculation formula, is smaller than $R_{Right}+R_{RX}$ and is ignorable, $R_{TX}$ of the numerator may significantly affect the crosstalk.

Figure 3:
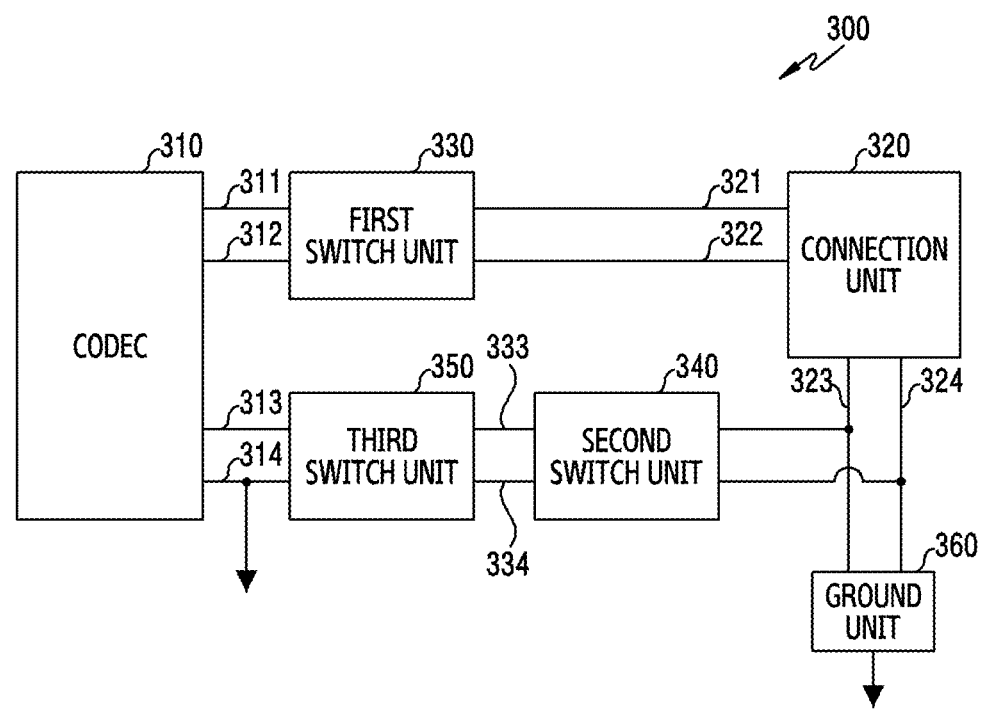
FIG. 3 illustrates a block diagram of a wiring structure between a connection unit and a codec in an electronic device according to an embodiment of the disclosure.

FIG. 3 illustrates a block diagram 300 of a wiring structure between a connection unit and a codec in an electronic device according to an embodiment of the disclosure. Referring to FIG. 3, a configuration in which the electronic device 101 and the audio device are connected may include a codec 310, a connection unit 320, a first switch unit 330, a second switch unit 340, a third switch unit 350, and a ground unit 360.

The codec 310 may process an audio signal. For example, the codec 310 may generate an audio signal to transmit to the audio device, and process a signal inputted from the audio device, as data. The codec 310 may be implemented as part of the audio module 170 of FIG. 1.

According to an embodiment, the codec 310 may identify a coupling orientation of a device connected to the connection unit 320. For example, the codec 310 may apply voltage to at least one of wires 313 and 314, and identify the coupling orientation based on the voltage measured at least one of the wires 313 and 314. For example, the codec 310 may apply the voltage to the wires 313 and 314, and identify the coupling orientation by measuring the voltage at the codec from wires 311 and 312. For example, since an internal resistor of a microphone is connected to a ground wire if the audio device is coupled in a reverse orientation and the voltage measured in the reverse orientation may be higher than voltage measured in a forward orientation, the codec 310 may identify the coupling orientation of the audio device based on the measured voltage. The codec 310 may provide an AP with a signal indicating the identified coupling orientation.

The connection unit 320 may be a component for coupling with the audio device. The connection unit 320 may be of a type-C USB type. The connection unit 320 may include a plurality of ports, and the plurality of the ports may include the ports of Table 1. The connection unit 320 may be part of the connecting terminal 178 of FIG. 1.

The wires 311 through 334 may deliver signals between the codec 310 and the connection unit 320. Whether to connect the wires 311 through 334 and connections of the wires 311 through 334 may differ according to states of the first switch unit 330, the second switch unit 340, and the third switch unit 350. The wires 311, 312, 321 and 322 may be used to receive an audio signal from the audio device connected through the connection unit 320, and may be referred to as a reception wire(s). The wires 313, 314, 323, 324, 333, and 334 may be used to transmit an audio signal to the audio device connected through the connection unit 320, and may be referred to as a transmission wire(s).

The first switch unit 330 may selectively connect the wires 311 and 312 and the wires 321 and 322. For example, if the audio device is coupled to the electronic device 101 through the connection unit 320, the first switch unit 330 may connect the wires 311 and 312 connected to the codec 310 and the wires 321 and 322 connected to the connection unit 320.

The second switch unit 340 may selectively connect the wires 323 and 324 and the wires 333 and 334. For example, if the audio device is coupled to the electronic device 101 through the connection unit 320, the second switch unit 340 may connect the wires 323 and 324 connected to the connecting terminal 178 and the wires 333 and 334 connected to the third switch unit 350.

The third switch unit 350 may control the connections of the wires 333 and 334 and the wires 313 and 314. The third switch unit 350 may control the connections of the wires 333 and 334 and the wires 313 and 314 based on the coupling orientation of the connection unit 320 and the audio device. For example, if the audio device and the connection unit 320 are coupled in the forward orientation, the third switch unit 350 may connect the first wire 313 connected to the codec with the first wire 333 connected to the audio device, and connect the second wire 314 connected to the codec 310 with the second wire 334 connected to the audio device. If the audio device and the connection unit 320 are coupled in the reverse orientation, the third switch unit 350 may connect the first wire 313 connected to the codec 310 with the second wire 334 connected to the audio device, and connect the second wire 314 connected to the codec 310 with the first wire 333 connected to the audio device.

The ground unit 360 may selectively ground one of the wires 323 and 324 of the connecting terminal 178 of the transmission side of the audio device. The ground unit 360 may ground the wire connected to a ground port of the audio device among the wires 323 and 324, based on the coupling orientation of the electronic device 101 and the audio device. For example, the ground unit 360 may ground one of the wires 323 and 324 according to the coupling orientation of the electronic device 101 and the audio device. According to an embodiment, if the first wire 323 connected to the connection unit 320 is connected to the GND port of the audio device and the second wire 324 is connected to the MIC port of the audio device, the ground unit 360 may ground the first wire 323. According to an embodiment, if the first wire 323 connected to the connection unit 320 is connected to the MIC port of the audio device and the second wire 324 is connected to the GND port of the audio device, the ground unit 360 may ground the second wire 324. The wire which is not grounded may be controlled in the open state. For example, the ungrounded wire may be controlled to connect with an open pin of the ground unit 360. The ungrounded wire, which is disconnected, may exert no influence on the circuit which is connected to the ungrounded wire. For example, the ungrounded wire may have any effect on the ground unit 360.

Figure 4:
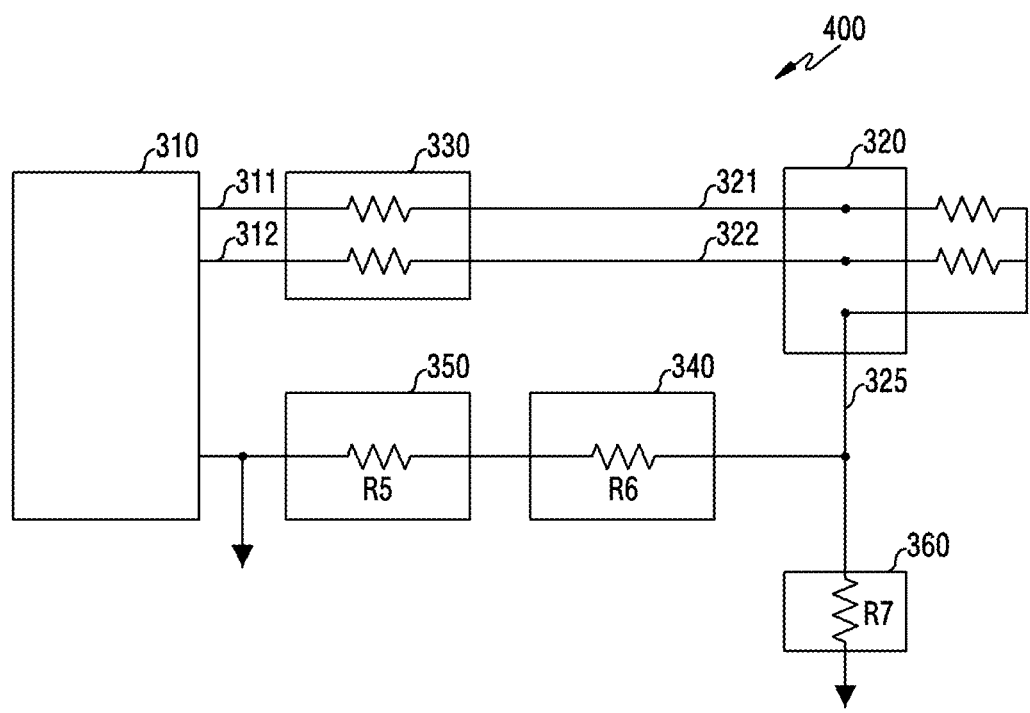
FIG. 4 illustrates an equivalent circuit diagram in which an audio device is connected to a connection unit in an electronic device according to an embodiment of the disclosure.

FIG. 4 illustrates an equivalent circuit diagram 400 in which an audio device is connected to a connection unit in an electronic device according to an embodiment of the disclosure. In the circuit diagram 400 of FIG. 4, the ground unit 360 grounds a wire 325 (e.g., one of the wire 323 or the wire 324) connected to the GND port of the audio device among the wires connected to the connection unit 320.

Referring to FIG. 4, R5>0, R6>0, and R7>0, and the composite resistance $R_{Tx1}$ in the electronic device 101 connected to a transmission circuit of the audio device is (R5+R6)//R7. If the wire 325 is not grounded, the composite resistance $R_{Tx2}$ is R5+R6 and $R_{Tx2} > R_{Tx1}$, and accordingly the ground unit 360 may ground the wire 325, thus reducing the magnitude of the internal composite resistance connected to the transmission circuit of the audio device and reducing the crosstalk.

Figure 5A:
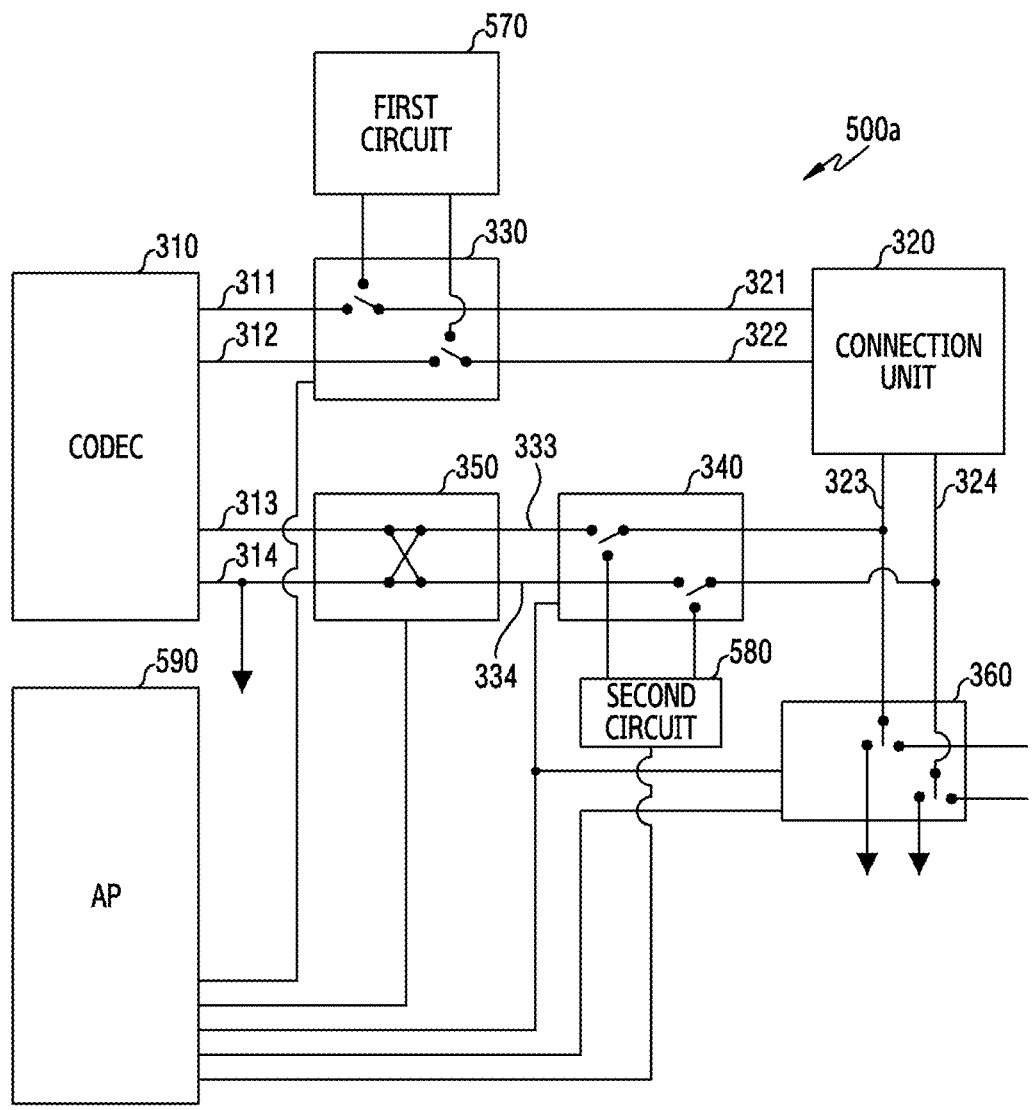
FIG. 5A illustrates an example of a wiring structure between a connection unit and a codec in an electronic device according to an embodiment of the disclosure.

FIG. 5A illustrates an example 500a of a wiring structure between a connection unit and a codec in an electronic device according to an embodiment of the disclosure. Referring to FIG. 5A, a configuration in which the electronic device 101 and the audio device are connected may include a codec 310, a connection unit 320 of the electronic device, a first switch unit 330, a second switch unit 340, a third switch unit 350, a ground unit 360, a first circuit 570, a second circuit 580 and/or an AP 590.

Referring to FIG. 5A, the first circuit 570 may be a different component from the codec 310 which is connectable via the connection unit 320. For example, if other device (e.g., a USB device) than the audio device (e.g., an earphone) is coupled to the connection unit 320, the first switch unit 330 may be controlled to connect the first circuit 570 and the connection unit 320. For example, the first circuit 570 may be an interface power management integrated circuit (IF-PMIC). The IF-PMIC may integrate functions of 5:1 multiplexer (MUX) switch, an adaptive fast charge (AFC) and/or a flash light emitting diode (LED) driver.

The second circuit 580 may be a different component from the codec 310 which is connectable via the connection unit 320. For example, if other device (e.g., a USB device)

than the audio device (e.g., an earphone) is coupled to the connection unit 320, the second switch unit 340 may be controlled to connect the second circuit 580 and the connection unit 320.

According to another embodiment, the second circuit 580 may identify the device coupled to the connection unit 320. For example, the second circuit 580 may apply current to a particular port (e.g., a CC port) of the connection unit 320, and identify the coupled device based on a signal change (e.g., a voltage change) of a corresponding port if other device is coupled to the connection unit 320. For example, the second circuit 580 may be a configuration channel (CC)-IC. The CC-IC may measure the resistance inside an accessory connected to the CC port of the connection unit 320, and identify the purpose of the accessory based on the measured resistance value. For example, if the resistance value is measured within a range which is set as the internal resistance value of the audio device, the CC-IC may recognize that the connected accessory is an audio device. The CC-IC may be connected to the SBU1 and/or SBU2 port of the connection unit 320 to perform an additional function according to the purpose of the connected accessory. The CC-IC may be replaced by a power delivery (PD)-IC, and the PD-IC may carry out a similar function to the CC-IC.

The AP 590 may control the first switch 330, the second switch unit 340, the third switch unit 350, and the ground unit 360. The AP 590 may be the processor 120 of FIG. 1, or may be part of the processor 120. For example, the AP 590 may output at least one control signal for controlling the first switch 330, the second switch unit 340, the third switch unit 350, and/or the ground unit 360. A value of the at least one control signal may be determined based on the identification result of the external device coupled to the connection unit 320 and/or the coupling orientation of the connection unit 320 and the external device. The at least one control signal may be a signal of general-purpose input/output (GPIO).

According to an embodiment, the AP 590 may identify the device coupled to the connection unit 320, and control the state of the first switch unit 330 and/or the second switch unit 340 according to the identified device. For example, the AP 590 may identify the device coupled to the connection unit 320 based on a signal received from the second circuit 580. If receiving a signal indicating that the connection unit 320 and the audio device are coupled, the AP 590 may transmit signals for controlling to establish a path between the audio device and the codec 310, to the first switch unit 330 and/or the second switch unit 340. For example, the signal for controlling the first switch unit 330 may be referred to as JACK_CONT, and the signal for controlling the second switch unit 340 may be referred to as SBU_SW_SEL.

According to an embodiment, the AP 590 may identify the coupling orientation of the connection unit 320 and the external device (e.g., the audio device), and control the state of the third switch unit 350 and/or the ground unit 360 according to the identified coupling orientation. For example, the AP 590 may identify the coupling orientation of the device coupled to the connection unit 320 based on a signal received from the codec 310. If the connection unit 320 and the audio device are coupled in the reverse orientation, the AP 590 may transmit to the third switch unit 350a signal for controlling to swap the wires 313 and 314 and the wires 333 and 334. The AP 590 may transmit to the ground unit 360 a signal for controlling to ground one of the wires 323 and 324 based on the coupling orientation of the connection unit 320 and the audio device. For example, the signal for controlling the third switch unit 350 may be referred to as SBU_SW_SEL, and the signals for controlling the ground unit 360 may be referred to as SBU_SW_SEL and/or GND_SEL.

According to an embodiment, the control signal (hereafter, referred to as an orientation control signal) for controlling the third switch unit 350 and the control signal (hereafter, referred to as a ground control signal) for controlling the ground unit 360 may be set to opposite values. If the external device is not coupled to the connection unit 320, the orientation control signal and the ground control signal may be set to a first value (e.g., LOW) which is a default value. If the external device is coupled to the connection unit 320, the orientation control signal and the ground control signal may be set to the first value (e.g., LOW) and a second value (e.g., HIGH) respectively or the second value and the first value respectively, according to the coupling orientation. The orientation control signal and the ground control signal may be defined as shown in Table 2.

TABLE 2

| Case | Orientation control signal | Ground control signal |
|---|---|---|
| No external device | LOW | LOW |
| Earphone (3 poles) | LOW | HIGH |
| Earphone (4 poles)-forward orientation | LOW | HIGH |
| Earphone (4 poles)-reverse orientation | HIGH | LOW |

In the embodiment of FIG. 5A, the ground unit 360 may be connected to the wires 323 and 324. According to other embodiments, the ground unit 360 may be disposed at a different position, or may be coupled with other component. The other embodiments for the disposition of the ground unit 360 are described by referring to FIG. 5B and FIG. 5C.

Figure 5B:
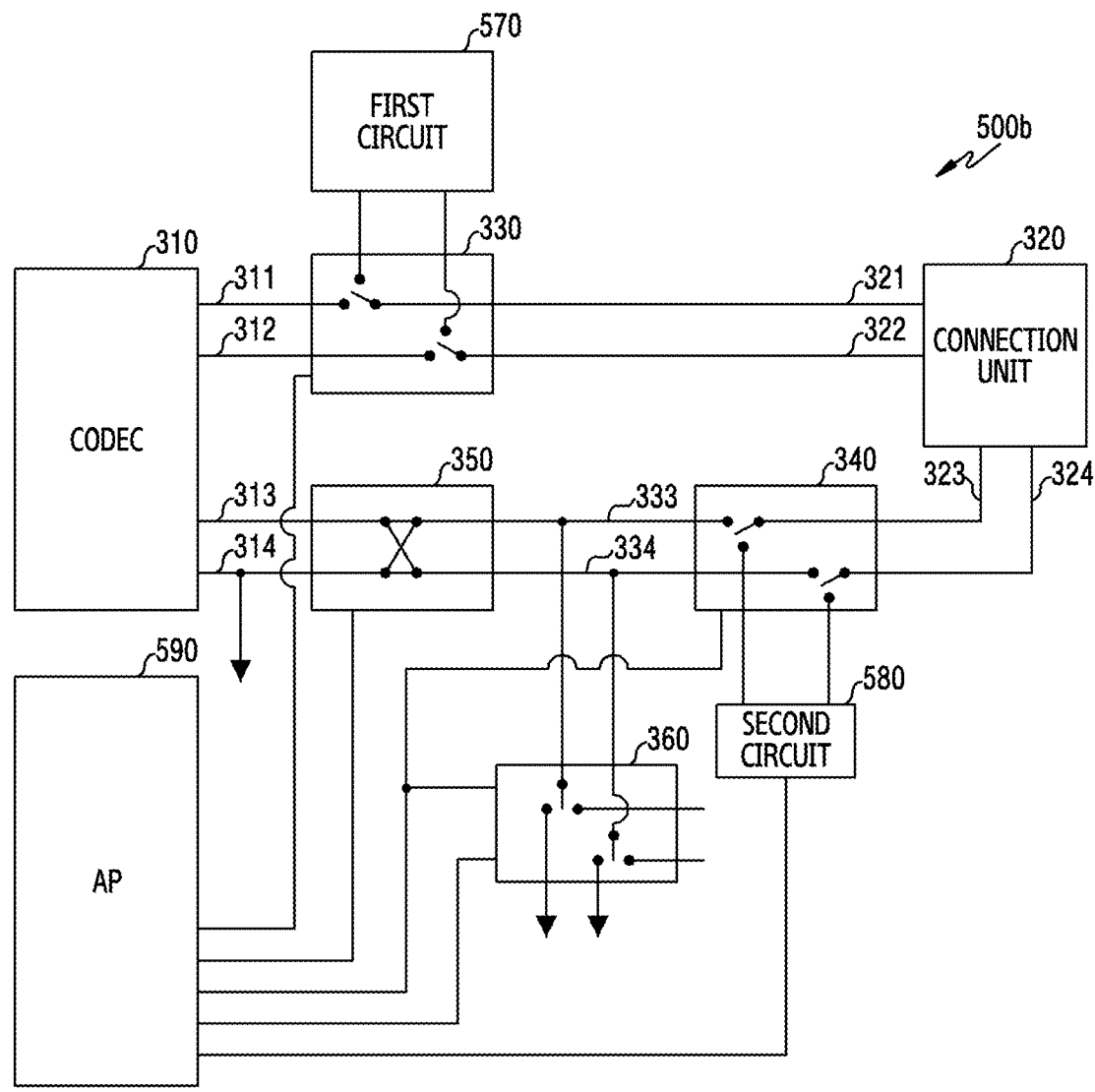
FIG. 5B illustrates another example of the wiring structure between the connection unit and the codec in the electronic device according to an embodiment of the disclosure.

FIG. 5B illustrates another example 500b of the wiring structure between the connector and the codec in the electronic device according to an embodiment of the disclosure. Referring to FIG. 5B, the ground unit 360 may be interposed between the second switch unit 340 and the third switch unit 350. The implementation of FIG. 5B may be adopted, if it is not easy to dispose the ground unit 360 in the wire between the connection unit 320 and the second switch unit 340 due to the lack of a design space of a PCB.

Figure 5C:
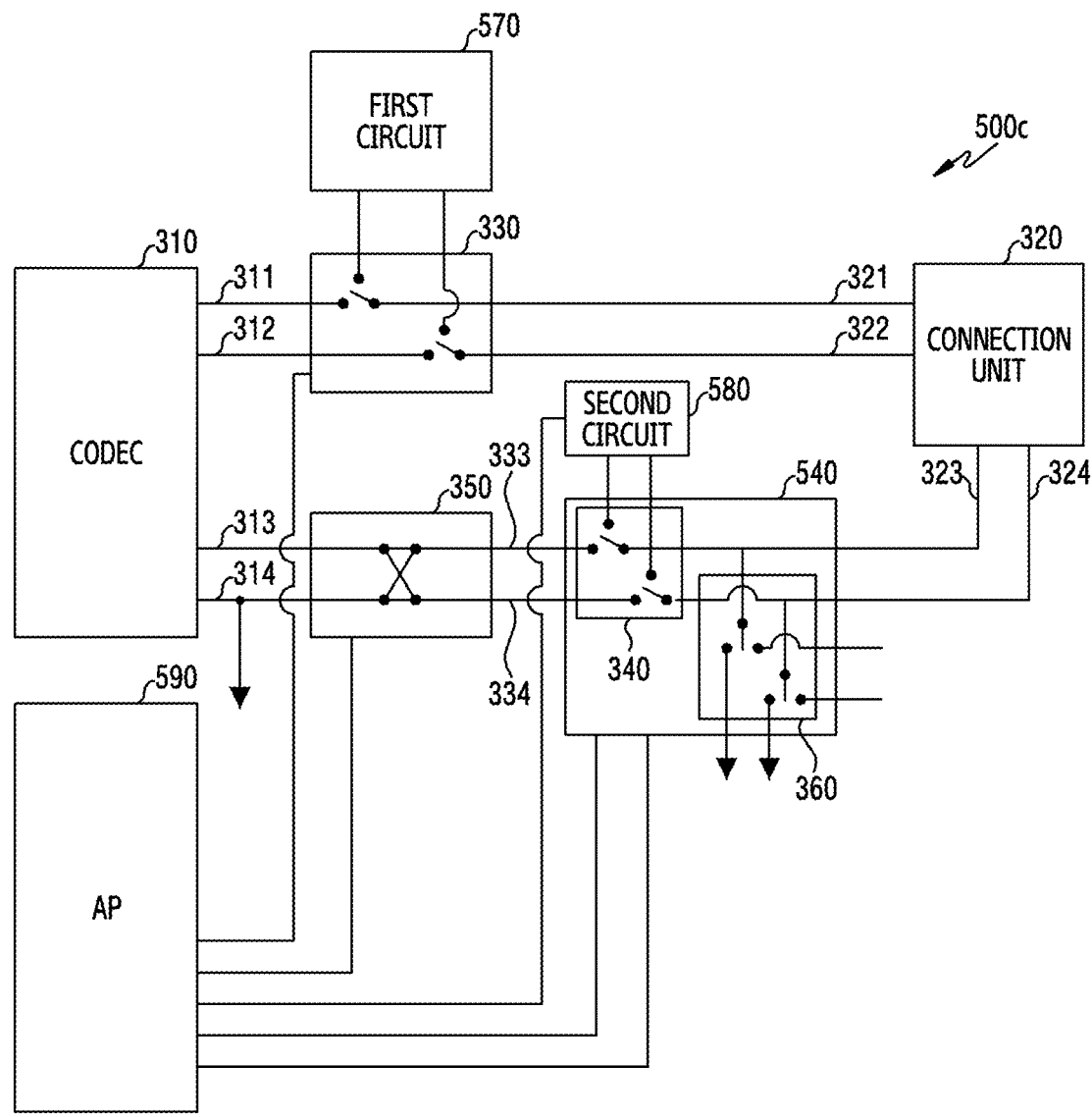
FIG. 5C illustrates yet another example of the wiring structure between the connection unit and the codec in the electronic device according to an embodiment of the disclosure.

FIG. 5C illustrates yet another example 500c of the wiring structure between the connector and the codec in the electronic device according to an embodiment of the disclosure. Referring to FIG. 5C, the second switch unit 340 and the ground unit 360 may be implemented as a single switching unit 540. The switching unit 540 may be referred to as a MUX. The switching unit 540 may function as both of the second switch unit 340 and the ground unit 360. The implementation of FIG. 5C may be adopted to ease the circuit design.

According to an embodiment of the disclosure, an electronic device (e.g., the electronic device 101) may include a connection unit (e.g., the connection unit 320) including a first port, a second port, a third port, and a fourth port for connecting an external audio device, a codec (e.g., the codec 310) configured to generate an audio signal transmitted to the external audio device, a first switch unit (e.g., the first switch unit 330) configured to, if the external audio device is electrically connected to the electronic device, connect the first port and the second port with the codec, a second switch unit (e.g., the second switch unit 340) configured to, if the external audio device is electrically connected to the electronic device, connect the third port and the fourth port with the codec, a third switch unit (e.g., the third switch unit 350) configured to swap connection directions of the third port and the fourth port according to a coupling orientation of the external audio device and the electronic device, and a ground unit (e.g., the ground unit 360) connected to the third port and the fourth port and configured to ground one of the third port and the fourth port, wherein one of the third port and the fourth port, the one grounded, may be selected based on the coupling orientation of the external audio device.

According to an embodiment of the disclosure, the codec (e.g., the codec 310) may be configured to apply voltage to a wire connected to one of the third port and the fourth port, and determine the coupling orientation based on a voltage level measured at the wire connected to one of the first port and the second port.

According to an embodiment of the disclosure, the electronic device may further include a processor (e.g., the processor 120 or the AP 590). The processor may be configured to generate at least one signal for controlling the ground unit (e.g., the ground unit 360) according to the coupling orientation.

According to an embodiment of the disclosure, the at least one signal for controlling the ground unit may include a first signal used to swap the connection directions of the third port and the fourth port through the third switch unit (e.g., the third switch unit 350), and a second signal used to ground one of the third port and the fourth port through the ground unit.

According to an embodiment of the disclosure, if the electronic device and the external audio device are coupled in a forward orientation, the first signal may be set to a first value and the second signal is set to a second value, if the electronic device and the external audio device are coupled in a reverse orientation, the first signal may be set to the second value and the second signal is set to the first value, and f the electronic device and the external audio device are not coupled, the first signal may be set to the first value and the second signal is set to the first value.

According to an embodiment of the disclosure, the ground unit (e.g., the ground unit 360) is connected to a wire between the second switch unit (e.g., the second switch unit 340) and the connection unit (e.g., the connection unit 320).

According to an embodiment of the disclosure, the ground unit (e.g., the ground unit 360) may be connected to a wire between the second switch unit (e.g., the second switch unit 340) and the third switch unit (e.g., the third switch unit 350).

According to an embodiment of the disclosure, the ground unit (e.g., the ground unit 360) may be configured as a MUX circuit with the second switch unit (e.g., the second switch unit 340).

According to an embodiment of the disclosure, the third port may be an SBU1 port of the electronic device, the fourth port may be an SBU2 port of the electronic device, and the coupling orientation may be a forward orientation or a reverse orientation, the forward orientation may connect a GND port of the external audio device to the SBU1 port of the electronic device and connect an MIC port of the external audio device to the SBU2 port of the electronic device, and the reverse orientation may connect the GND port of the external audio device to the SBU2 port of the electronic device and connect the MIC port of the external audio device to the SBU1 port of the electronic device.

According to an embodiment of the disclosure, the connection unit may be a type-C USB connection unit.

Figure 6:
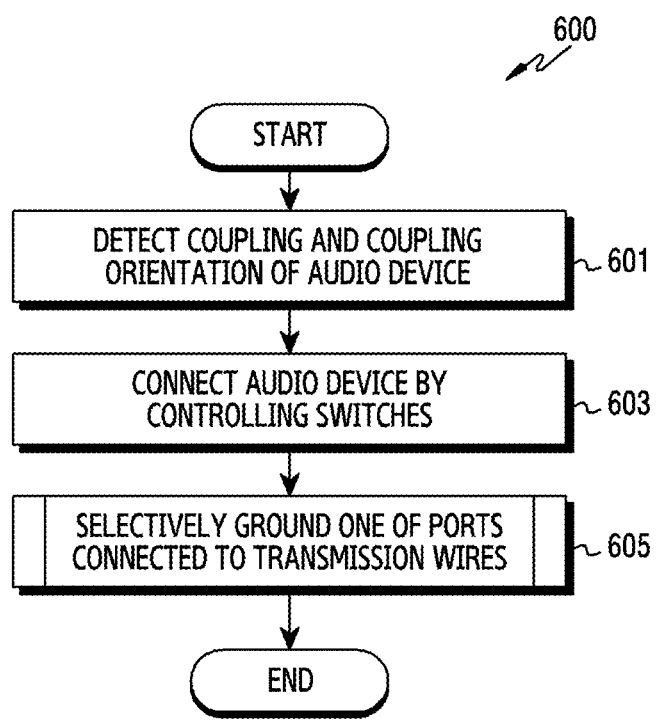
FIG. 6 illustrates a flowchart for connecting an audio device in an electronic device according to an embodiment of the disclosure.

FIG. 6 illustrates a flowchart 600 for connecting an audio device in an electronic device according to an embodiment of the disclosure. An operating entity of the flowchart 600 of FIG. 6 may be construed as the electronic device 101 or the component (e.g., the processor 120 or the AP 590) of the electronic device 101.

Referring to FIG. 6, in operation 601, the electronic device 101 (e.g., the processor 120 or the AP 590) may detect the coupling and the coupling orientation of the audio device. For example, if a connector of the audio device is coupled to a connection unit (e.g., the connection unit 320) of the electronic device, the voltage applied to the connection unit of the electronic device may change according to the internal resistance value of the audio device. The electronic device 101 may, while operating in a recognition standby state, detect the coupling of the audio device by recognizing the changing voltage. The electronic device 101 may estimate the internal resistance value of the coupled device based on the change of the voltage value, and detect the coupling of the audio device based on whether the resistance value falls within a specific range (e.g., less than 1200Ω).

In operation 603, the electronic device 101 may connect the audio device by controlling switches. For example, the electronic device 101 may control a first switch unit (e.g., the first switch unit 330) and a second switch unit (e.g., the second switch unit 340) to connect the codec of the electronic device 101 with the audio device. The electronic device 101 may control a third switch unit (e.g., the third switch unit 350) to switch the port connection direction of the connection unit and the audio device connector based on the coupling orientation of the connector of the audio device.

In operation 605, the electronic device 101 may selectively ground one of ports connected to transmission wires. For example, the electronic device 101 may ground the wire connected to the GND port of the connector of the audio device. The electronic device 101 may control a ground unit (e.g., the ground unit 360) to ground the GND port.

Figure 7:
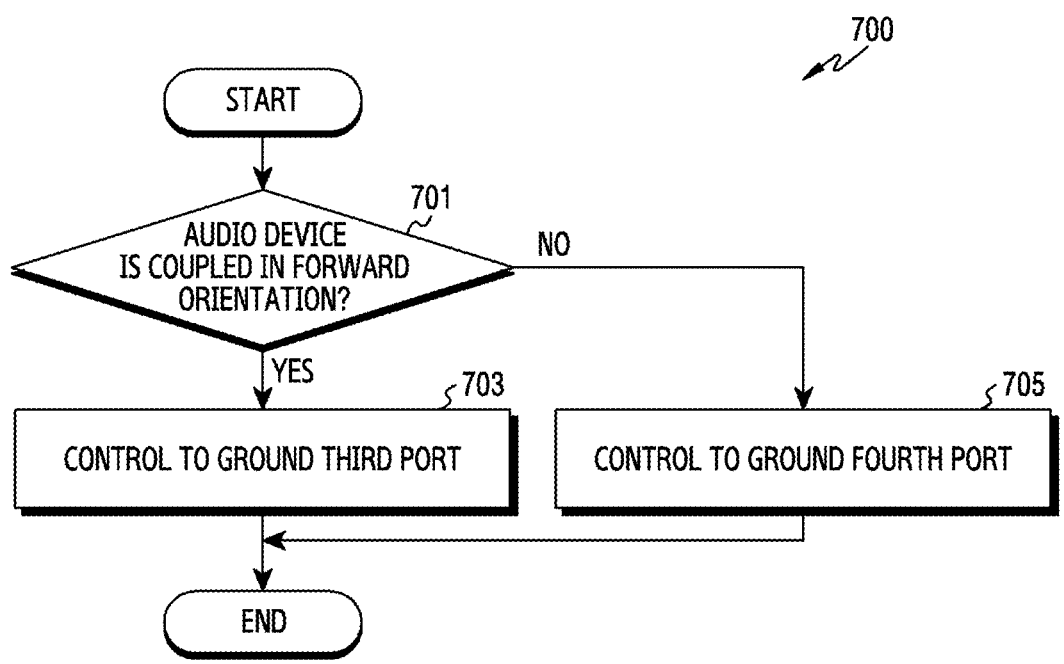
FIG. 7 illustrates a flowchart for selectively grounding one of transmission wires in an electronic device according to an embodiment of the disclosure.

FIG. 7 illustrates a flowchart 700 for selectively grounding one of transmission wires in an electronic device according to an embodiment of the disclosure. An operating entity of the flowchart 700 of FIG. 7 may be construed as the electronic device 101 or the component (e.g., the processor 120 or the AP 590) of the electronic device 101. The flowchart 700 of FIG. 7 may be an example of operation 605 of FIG. 6.

Referring to FIG. 7, in operation 701, the electronic device 101 (e.g., the processor 120 or the AP 590) may determine whether the audio device is coupled in the forward orientation. For example, whether the audio device is coupled in the forward orientation may be detected by the codec 310, and may be provided to the processor 120 or the AP 590. Since a type-C connector (e.g., the connection unit 320) is coupled in any orientation, ports of the type-C connector and ports of the connector of the audio device may be connected differently according to the coupling orientation. For example, the GND port of the connector of the audio device may be connected to the A8 port in the forward orientation, and the GND port of the connector of the audio device may be connected to the B8 port in the reverse orientation.

If the audio device is coupled in the forward orientation, the electronic device 101 may control to ground a third port in operation 703. If the audio device is coupled in the reverse orientation, the electronic device 101 may control to ground a fourth port in operation 705. The third port and the fourth port may be the ports of the connection unit of the electronic device 101 to which the transmission wires are connected.

According to an embodiment of the disclosure, an operating method of an electronic device (e.g., the electronic device 101) may include detecting coupling of an external audio device and a connection unit (e.g., the connection unit 320), detecting an orientation of the detected coupling of the external audio device, connecting ports of the external audio device to a codec, by controlling switch units (e.g., the first switch unit 330, the second switch unit 340 or the third switch unit 350) connected to wires between the external audio device and the codec (e.g., the codec 310), and grounding one of ports connected to a transmission wire of the wires according to the coupling orientation.

According to an embodiment of the disclosure, the wires may include reception wires connectable to a first port and a second port of the connection unit (e.g., the connection unit 320) and transmission wires connectable to a third port and a fourth port, and detecting the coupling orientation may include applying voltage to a wire connected to one of the third port and the fourth port, and determining the coupling orientation based on a voltage level measured at a wire connected to one of the first port and the second port.

According to an embodiment of the disclosure, the operating method of the electronic device may further include generating at least one signal for controlling to ground the one port according to the coupling orientation.

According to an embodiment of the disclosure, the wires may include reception wires connectable to a first port and a second port of the connection unit (e.g., the connection unit 320) and transmission wires connectable to a third port and a fourth port, and the switch units (e.g., the first switch unit 330, the second switch unit 340 or the third switch unit 350) may include a first switch unit (e.g., the first switch unit 330) connected to the reception wires, and a second switch unit (e.g., the second switch unit 340) and a third switch unit (e.g., the third switch unit 350) connected to the transmission wires, and the at least one signal may include a first signal used to swap connection directions of the third port and the fourth port through the third switch unit, and a second signal used to ground one of the third port and the fourth port.

According to an embodiment of the disclosure, if the connection unit (e.g., the connection unit 320) and the external audio device are coupled in a forward orientation, the first signal may be set to a first value and the second signal may be set to a second value, if the connection unit and the external audio device are coupled in a reverse orientation, the first signal is set to the second value and the second signal is set to the first value, and if the connection unit and the external audio device are not coupled, the first signal is set to the first value and the second signal is set to the first value.

According to an embodiment of the disclosure, a circuit (e.g., the ground unit 360) for grounding one of the ports connected to the transmission wire is connected to a wire between the second switch unit (e.g., the second switch unit 340) and the connection unit (e.g., the connection unit 320).

According to an embodiment of the disclosure, a circuit (e.g., the ground unit 360) for grounding one of the ports connected to the transmission wire is connected to a wire between the second switch unit (e.g., the second switch unit 340) and the third switch unit (e.g., the third switch unit 350).

According to an embodiment of the disclosure, a circuit (e.g., the ground unit 360) for grounding one of the ports connected to the transmission wire is configured as a MUX circuit with the second switch unit (e.g., the second switch unit 340).

According to an embodiment of the disclosure, the third port may be an SBU1 port of the electronic device (e.g., the electronic device 101), the fourth port may be an SBU2 port of the electronic device, and the coupling orientation may be a forward orientation or a reverse orientation, the forward orientation may connect a GND port of the external audio device to the SBU1 port of the electronic device and connect an MIC port of the external audio device to the SBU2 port of the electronic device, and the reverse orientation may connect the GND port of the external audio device to the SBU2 port of the electronic device and connect the MIC port of the external audio device to the SBU1 port of the electronic device.

According to an embodiment of the disclosure, the connection unit (e.g., the connection unit 320) is a type-C USB connection unit.

According to an embodiment as mentioned above, the GND port of the audio device connected to the electronic device 101 may be grounded. The operations according to the above-stated embodiments may improve crosstalk performance. Provided that resistance of a switch is 0.9Ω, resistance of a bead is 0.49Ω, resistance of an interface connection is 0.6Ω, resistance of a wire is 0.3Ω, and resistance of a ground switch is 0.45Ω, the composite resistance and the crosstalk of the transmission wire before and after the disclosure is applied are shown in Table 3.

TABLE 3

| | RX resistance | TX resistance | Crosstalk |
| --- | --- | --- | --- |
| Conventional | 4.99 Ω | 2.29 Ω | −24.6867 dB |
| Disclosure | 4.99 Ω | 0.38 Ω | −39.9436 dB |

Based on Table 3, the improvement of about 15 dB may be expected. The method for selectively lowering the composite resistance of the transmission wire through the ground switching in various embodiments may be effective.

The electronic device according to an embodiment may be various types of the electronic device. The electronic device may include, for example, a portable communication device (e.g., a smart phone), a computer device, a portable multimedia device, a portable medical device, a camera, a wearable device, or a home appliance. The electronic device according to an embodiment of the disclosure is not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., the internal memory 136 or the external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. The term "non-transitory" simply means that the storage medium is a tangible device, and does not include a signal (e.g., an electromagnetic (EM) wave), but this term does not differentiate between where data is semi-permanently stored in the storage medium and where the data is temporarily stored in the storage medium.

According to an embodiment, a method according to an embodiment of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to an embodiment, each component (e.g., a module or a program) of the above-described components may include a single entity or multiple entities. According to an embodiment, one or more of the above-described components may be omitted, or one or more other components may be added. Alternatively or additionally, a plurality of components (e.g., modules or programs) may be integrated into a single component. In such a case, according to an embodiment, the integrated component may still perform one or more functions of each of the plurality of components in the same or similar manner as they are performed by a corresponding one of the plurality of components before the integration. According to an embodiment, operations performed by the module, the program, or another component may be carried out sequentially, in parallel, repeatedly, or heuristically, or one or more of the operations may be executed in a different order or omitted, or one or more other operations may be added.

A method and an electronic device according to an embodiment may improve crosstalk performance, by selectively grounding part of wires which connect an earphone connected through a type-C connector with a codec.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device comprising:
a connection unit comprising a first port, a second port, a third port, and a fourth port for connecting an external audio device;
a codec configured to generate an audio signal transmitted to the external audio device;
a first switch unit configured to, if the external audio device is electrically connected to the electronic device through the connection unit, connect the first port and the second port with the codec;
a second switch unit configured to, if the external audio device is electrically connected to the electronic device through the connection unit, connect the third port and the fourth port with the codec, wherein the third port is a sideband use (SBU)1 port of the electronic device and the fourth port is an SBU2 port of the electronic device;
a third switch unit coupled between the codec and the second switch unit and configured to swap connection directions of the third port and the fourth port based on a coupling orientation of the external audio device and the electronic device, wherein, when the coupling orientation is a forward orientation, a ground (GND) port of the external audio device is connected to the third port and a microphone (MIC) port of the external audio device is connected to the fourth port, and when the coupling orientation is a reverse orientation, the GND port of the external audio device is connected to the fourth port and the MIC port of the external audio device is connected to the third port;
a ground unit connected to a first wire between the second switch unit and the third port and connected to a second wire between the second switch unit and the fourth port, and configured to connect one of the first wire and the second wire with a ground area of the electronic device based on the coupling orientation, wherein, when the third port is connected to the GND port of the external audio device, the first wire is connected with the ground area of the electronic device and when the fourth port is connected to the GND port of the external audio device, the second wire is connected with the ground area of the electronic device; and
a processor configured to transmit to the third switch unit a first signal for controlling to swap the connection directions of the third port and the fourth port based on the coupling orientation and transmit to the ground unit a second signal for controlling to connect one of the first wire and the second wire with the ground area of the electronic device based on the coupling orientation.

2. The electronic device of claim 1, wherein the codec is configured to:
apply voltage to a wire connected to one of the third port and the fourth port; and determine the coupling orientation based on a voltage level measured at a wire connected to one of the first port and the second port.

3. The electronic device of claim 1, wherein:
if the coupling orientation is the forward orientation, the first signal is set to a first value and the second signal is set to a second value,
if the coupling orientation is the reverse orientation, the first signal is set to the second value and the second signal is set to the first value, and
if the electronic device and the external audio device are not coupled, the first signal is set to the first value and the second signal is set to the first value.

4. The electronic device of claim 1, wherein the ground unit is configured as a multiplexer (MUX) circuit with the second switch unit.

5. The electronic device of claim 1, wherein the connection unit is a type-C universal serial bus (USB) connection unit.

6. An operating method of an electronic device, comprising:
detecting coupling of an external audio device and a connection unit of the electronic device;
detecting a coupling orientation of the external audio device and the connection unit;
in response to detecting the coupling of the external audio device and the connection unit, connecting a first port and a second port of the connection unit with a codec of the electronic device by controlling a first switch unit connected between the connection unit and the codec;
in response to detecting the coupling of the external audio device and the connection unit, connecting a third port and a fourth port of the connection unit with the codec by controlling a second switch unit connected between the connection unit and a third switch unit, wherein the third port is a sideband use (SBU)1 port of the electronic device and the fourth port is an SBU2 port of the electronic device;
swapping connection directions of the third port and the fourth port based on the coupling orientation by controlling the third switch unit which is connected between the codec and the second switch unit and configured to receive, from a processor of the electronic device, a first signal for controlling to swap the connection directions of the third port and the fourth port based on the coupling orientation, wherein, when the coupling orientation is a forward orientation, a ground (GND) port of the external audio device is connected to the third port and a microphone (MIC) port of the external audio device is connected to the fourth port, and when the coupling orientation is a reverse orientation, the GND port of the external audio device is connected to the fourth port and the MIC port of the external audio device is connected to the third port; and
connecting one of a first wire between the second switch unit and the third port and a second wire between the second switch unit and the fourth port with a ground area of the electronic device based on the coupling orientation by controlling a ground unit which is connected to the first wire and the second wire and configured to receive, from the processor, a second signal for controlling to connect one of the first wire and the second wire with the ground area of the electronic device based on the coupling orientation, wherein, when the third port is connected to the GND port of the external audio device, the first wire is connected with the ground area of the electronic device and when the fourth port is connected to the GND port of the external audio device, the second wire is connected with the ground area of the electronic device.

7. The operating method of claim 6, wherein detecting the coupling orientation comprises:
applying voltage to a wire connected to one of the third port and the fourth port, and
determining the coupling orientation based on a voltage level measured at a wire connected to one of the first port and the second port.

8. The operating method of claim 6, wherein:
if the coupling orientation is the forward orientation, the first signal is set to a first value and the second signal is set to a second value,
if the coupling orientation is the reverse orientation, the first signal is set to the second value and the second signal is set to the first value, and
if the connection unit and the external audio device are not coupled, the first signal is set to the first value and the second signal is set to the first value.

9. The operating method of claim 6, wherein the ground unit is configured as a multiplexer (MUX) circuit with the second switch unit.

10. The operating method of claim 6, wherein the connection unit is a type-C universal serial bus (USB) connection unit.

* * * * *